United States Patent
Raziperchikolaei

(10) Patent No.: US 12,141,852 B2
(45) Date of Patent: Nov. 12, 2024

(54) METHODS FOR SIMULTANEOUS LEARNING OF INPUTS AND PARAMETERS ON MACHINE LEARNING-BASED RECOMMENDER SYSTEMS

(71) Applicant: Rakuten Group, Inc., Tokyo (JP)

(72) Inventor: Ramin Raziperchikolaei, Foster City, CA (US)

(73) Assignee: Rakuten Group, Inc., Tokyo (JP)

( * ) Notice: Subject to any disclaimer, the term of this patent is extended or adjusted under 35 U.S.C. 154(b) by 375 days.

(21) Appl. No.: 17/141,925

(22) Filed: Jan. 5, 2021

(65) Prior Publication Data
US 2022/0114643 A1     Apr. 14, 2022

Related U.S. Application Data

(60) Provisional application No. 63/089,677, filed on Oct. 9, 2020.

(51) Int. Cl.
*G06Q 30/06* (2023.01)
*G06F 18/21* (2023.01)
(Continued)

(52) U.S. Cl.
CPC ..... *G06Q 30/0631* (2013.01); *G06F 18/2155* (2023.01); *G06F 18/2193* (2023.01); *G06N 3/08* (2013.01); *G06Q 30/0282* (2013.01)

(58) Field of Classification Search
CPC ............... G06Q 30/06; G06Q 30/0631
See application file for complete search history.

(56) References Cited

U.S. PATENT DOCUMENTS

| 10,354,184 B1 | 7/2019 | Vitaladevuni et al. |
| 10,614,381 B2 | 4/2020 | Hoffman et al. |
(Continued)

FOREIGN PATENT DOCUMENTS

| CN | 110019652 | 7/2019 |
| CN | 110309331 | 10/2019 |

OTHER PUBLICATIONS

Zhao, T. (2018). Learning to search and recommend from users implicit feedback (Order No. 13837793). Available from ProQuest Dissertations and Theses Professional. (2178407575). Retrieved from https://dialog.proquest.com/professional/docview/2178407575?accountid=131444.*

(Continued)

*Primary Examiner* — Jeffrey A. Smith
*Assistant Examiner* — Jennifer V Lee
(74) *Attorney, Agent, or Firm* — Lessani Law Group, PC

(57) ABSTRACT

The present disclosure relates to a recommender system and method. Unlike known systems, which learn neural network parameters during training and fix the input vectors, the recommender system learns both the input vectors and machine learning model parameters during training. In one embodiment, the initial user and item input vectors are interaction vectors that are based on known and unknown user feedback. The non-zero elements of the interaction vectors correspond user-item pairs for which feedback is known, and the zero elements corresponding to user-item pairs for which feedback is unknown. The non-zero elements of the interaction vectors are learnable parameters during the training phase. The user and item vectors, as well as the model parameters, learned during the training phase are used in a prediction and recommendation phase to make product recommendations for a user.

12 Claims, 5 Drawing Sheets

EXAMPLE SYSTEM ARCHITECTURE

(51) Int. Cl.
  G06F 18/214 (2023.01)
  G06N 3/08 (2023.01)
  G06Q 30/0282 (2023.01)
  G06Q 30/0601 (2023.01)

(56) References Cited

U.S. PATENT DOCUMENTS

| | | | |
|---|---|---|---|
| 10,698,967 B2 | 6/2020 | Shen et al. | |
| 10,769,524 B1* | 9/2020 | Natesh | G06F 18/24 |
| 11,004,135 B1 | 5/2021 | Sandler et al. | |
| 11,361,365 B2 | 6/2022 | Greenwald | |
| 11,651,037 B2 | 5/2023 | Shi et al. | |
| 11,669,759 B2 | 6/2023 | Horowitz et al. | |
| 2009/0281923 A1 | 11/2009 | Selinger et al. | |
| 2014/0104495 A1 | 4/2014 | Preston et al. | |
| 2015/0154229 A1 | 6/2015 | An et al. | |
| 2017/0185894 A1 | 6/2017 | Volkovs et al. | |
| 2019/0034875 A1 | 1/2019 | Bryan et al. | |
| 2020/0004835 A1 | 1/2020 | Ramanath et al. | |
| 2020/0004886 A1 | 1/2020 | Ramanath et al. | |
| 2020/0005134 A1 | 1/2020 | Ramanath et al. | |
| 2020/0005149 A1 | 1/2020 | Ramanath et al. | |
| 2020/0175022 A1 | 6/2020 | Nowozin | |
| 2020/0211065 A1 | 7/2020 | Govindarajalu et al. | |
| 2020/0380027 A1 | 12/2020 | Aggarwal et al. | |
| 2021/0004437 A1 | 1/2021 | Zhang et al. | |
| 2021/0012150 A1 | 1/2021 | Liu et al. | |
| 2021/0073612 A1 | 3/2021 | Vahdat et al. | |
| 2021/0081462 A1 | 3/2021 | Lu et al. | |
| 2021/0097400 A1 | 4/2021 | Lee | |
| 2021/0110306 A1 | 4/2021 | Krishnan et al. | |
| 2021/0117839 A1 | 4/2021 | Kulkarni et al. | |
| 2021/0133846 A1* | 5/2021 | Xu | G06Q 30/0641 |
| 2021/0150337 A1 | 5/2021 | Raziperchikolaei | |
| 2021/0191990 A1 | 6/2021 | Shi et al. | |
| 2021/0350393 A1 | 11/2021 | Dagley et al. | |
| 2021/0383254 A1 | 12/2021 | Renders et al. | |
| 2021/0397892 A1 | 12/2021 | Huang et al. | |

OTHER PUBLICATIONS

Extended European Search Report dated Feb. 17, 2022, European Application No. 21193220.7.
Bronstein et al., "Data Fusion through Cross-modality Metric Learning using Similarity-Sensitive Hashing", 2010, pp. 1-8.
Cao et al., "Collective Deep Quantization for Efficient Cross-Modal Retrieval", Proceedings of the Thirty-First AAAI Conference on Artificial Intelligence, 2017, pp. 3974-3980.
Cao et al., "Correlation Hashing Network for Efficient Cross-Modal Retrieval", 2016, pp. 1-12.
Cheng et al., "Wide & Deep Learning for Recommender Systems", DLRS '16, Sep. 15, 2016, pp. 1-4.
Deng et al., "DeepCF: A Unified Framework of Representation Learning and Matching Function Learning in Recommender System", 2019, pp. 1-9.
Ding et al., "Collective Matrix Factorization Hashing for Multimodal Data", 2014, pp. 4321-4328.
Dong et al., "A Hybrid Collaborative Filtering Model with Deep Structure for Recommender Systems", Proceedings of the Thirty-First AAAI Conference on Artificial Intelligence, 2017, pp. 1309-1315.
Gong et al., "Learning Binary Codes for High-Dimensional Data Using Bilinear Projections", 2013, pp. 484-491.
Guo et al., "DeepFM: A Factorization-Machine based Neural Network for CTR Prediction", Proceedings of the Twenty-Sixth International Joint Conference on Artificial Intelligence, 2017, pp. 1725-1731.
He et al., "Neural Collaborative Filtering", WWW 2017, Apr. 3-7, 2017, pp. 1-10.
He et al., "Neural Factorization Machines for Sparse Predictive Analytics", SIGIR '17, Aug. 7-11, 2017, pp. 355-364.
He et al., "Outer Product-based Neural Collaborative Filtering", Proceedings of the Twenty-Seventh International Joint Conference on Artificial Intelligence 2018, pp. 2227-2233.
Jiang et al., "Deep Cross-Modal Hashing", 2017, pp. 3232-3240.
Koren, "Factorization Meets the Neighborhood: a Multifaceted Collaborative Filtering Model", KDD 2008, Aug. 24-27, 2008, pp. 426-434.
Kumar et al., "Learning Hash Functions for Cross-View Similarity Search", 2011, pp. 1-6.
Li et al., "Deep Binary Reconstruction for Cross-modal Hashing", MM '17, Oct. 23-27, 2017, pp. 1-8.
Li et al., "Deep Collaborative Filtering via Marginalized Denoising Auto-encoder", CIKM '15, Oct. 19-23, 2015, pp. 811-820.
Li et al., "Coupled Cycle-GAN: Unsupervised Hashing Network for Cross-Modal Retrieval", Thirty-Third AAAI Conference on Artificial Intelligence, 2019, pp. 176-183.
Li et al., "Deep Heterogeneous Autoencoders for Collaborative Filtering", 2018, pp. 1-6.
Li et al., "Self-Supervised Adversarial Hashing Networks for Cross-Modal Retrieval", 2018, pp. 4242-4251.
Lian et al., "xDeepFM: Combining Explicit and Implicit Feature Interactions for Recommender Systems", KDD 2018, Aug. 19-23, 2018, pp. 1-10.
Liu et al., "Recommender Systems with Heterogeneous Side Information", WWW '19, May 13-17, 2019, pp. 1-7.
Long et al., "Composite Correlation Quantization for Efficient Multimodal Retrieval", SIGIR '16, Jul. 17-21, 2016, pp. 1-11.
Ricci et al., "Recommender Systems Handbook", 2011.
Sedhain et al., "AutoRec: Autoencoders Meet Collaborative Filtering", WWW 2015 Companion, May 18-22, 2015, pp. 1-2.
Strub et al., "Hybrid Recommender System based on Autoencoders", Workshop on Deep Learning for Recommender Systems, Sep. 2016, pp. 1-7.
Su et al., "Deep Joint-Semantics Reconstructing Hashing for Large-Scale Unsupervised Cross-Modal Retrieval", 2019, pp. 3027-3035.
Takacs et al., "Matrix Factorization and Neighbor Based Algorithms for the Netflix Prize Problem", RecSys 2008, Oct. 23-25, 2008, pp. 267-274.
Wang et al., "Collaborative Deep Learning for Recommender Systems", KDD '15, Aug. 10-13, 2015, pp. 1235-1244.
Wang et al., "Effective Multi-Modal Retrieval based on Stacked Auto-Encoders", Proceedings of the VLDB Endowment, Sep. 1-5, 2014, pp. 649-660.
Wu et al., "Quantized Correlation Hashing for Fast Cross-Modal Search", Proceedings of the Twenty-Fourth International Joint Conference on Artificial Intelligence, 2015, pp. 3946-3952.
Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.
Xue et al., "Deep Matrix Factorization Models for Recommender Systems", Proceedings of the Twenty-Sixth International Joint Conference on Artificial Intelligence, 2017, pp. 3203-3209.
Yang et al., "Shared Predictive Cross-Modal Deep Quantization", IEEE Transaction on Neural Networks and Learning Systems, 2019, pp. 1-12.
Zhang et al., "AutoSVD++: An Efficient Hybrid Collaborative Filtering Model via Contractive Auto-encoders", SIGIR '17, Aug. 7-11, 2017, pp. 957-960.
Zhang et al., "Collaborative Quantization for Cross-Modal Similarity Search", 2019, pp. 1-10.
Zhang et al., "Large-Scale Multimodal Hashing with Semantic Correlation Maximization", Association for the Advancement of Artificial Intelligence, 2014, pp. 1-7.
Antoniou, +A53:A241 Antreas et al., "How to Train Your MAML", ICLR 2019.
Barkan, Oren et al. "CB2CF: A Neural Multiview Content-to-Collaborative Filtering Model for Completely Cold Item Recommendations", Proceedings of the 13th ACM Conference on Recommender Systems, 2019, pp. 1-9.
Bianchi, Federico et al., "Fantastic Embeddings and How to Align Them: Zero-Shot Inference in a Multi-Shop Scenario", SIGIR eCOM '20, Jul. 30, 2020, pp. 1-11.

(56) References Cited

OTHER PUBLICATIONS

Blei, David M. et al. "Latent Dirichlet Allocation", Journal of Machine Learning Research, 2003, pp. 993-1022.
Cai, Qi et al., "Memory Matching Networks for One-Shot Image Recognition", Proceedings of the IEEE Conference on Computer Vision and Pattern Recognition, 2018, pp. 4080-4088.
Cao et al., "Deep Visual-Semantic Hashing for Cross-Modal Retrieval", KDD '16: Proceedings of the 22nd ACM SIGKDD International Conference on Knowledge Discovery and Data Mining, Aug. 2016, pp. 1445-1454.
Chen, Jingyuan, et al. "Attentive Collaborative Filtering: Multimedia Recommendation with Item-and Component-Level Attention", Proceedings of the 40th International ACM SIGIR Conference on Research and Development in Information Retrieval, 2017.
Chen, Minmin et al. "Marginalized Denoising Autoencoders for Domain Adaptation", Proceedings of the 29th International Conference on Machine Learning, 2012.
Chen, Zhihong et al. "ESAM: Discriminative Domain Adaptation with Non-Displayed Items to Improve Long-Tail Performance", Proceedings of the 43rd International ACM SIGIR Conference on Research and Development in Information Retrieval, 2020, pp. 579-588.
Chopra, Sumit et al., "Learning a Similarity Metric Discriminatively, with Application to Face Verification", 2005 IEEE Computer Society Conference on Computer Vision and Pattern Recognition (CVPR'05), vol. 1. IEEE, 2005.
Deng, Zhi-Hong, et al. "Deepcf: A Unified Framework of Representation Learning and Matching Function Learning in Recommender System", Proceedings of the AAAI Conference on Artificial Intelligence, vol. 33, No. 1, 2019.
Dong, Xin et al. "A Hybrid Collaborative Filtering Model with Deep Structure for Recommender Systems", Proceedings of the Thirty-First AAAI Conference on Artificial Intelligence, 2017, vol. 31, No. 1, pp. 1309-1315.
Dong, Manqing et al., "MAMO: Memory-Augmented Meta-Optimization for Cold-Start Recommendation", Proceedings of the 26th ACM SIGKDD International Conference on Knowledge Discovery & Data Mining, 2020.
Du, Zhengxiao et al. "Sequential Scenario-Specific Meta Learner for Online Recommendation", Proceedings of the 25th ACM SIGKDD International Conference on Knowledge Discovery & Data Mining, 2019, pp. 2895-2904.
Finn, Chelsea et al. "Model-Agnostic Meta-Learning for Fast Adaptation of Deep Networks", Proceedings of the 34th International Conference on Machine Learning, vol. 70, 2017, pp. 1126-1135.
Gao, Chen et al. "Cross-domain Recommendation Without Sharing User-relevant Data", The World Wide Web Conference, 2019, pp. 491-502.
Gopalan, Prem et al., "Scalable Recommendation with Hierarchical Poisson Factorization", UAI, 2015.
He, et al., "Neural Collaborative Filtering" Proceedings of the 26th International Conference on World Wide Web (WWW '17) [online], Apr. 3, 2017, pp. 173-182.
He, Xiangnan et al. "Neural Collaborative Filtering", Proceedings of the 26th International Conference on World Wide Web, 2017.
He, Xiangnan, et al. "Outer Product-based Neural Collaborative Filtering", Proceedings of the Twenty-Seventh International Joint Conference on Artificial Intelligence, 2018, pp. 2227-2233.
He, Xiangnan, et al. "NAIS: Neural Attentive Item Similarity Model for Recommendation", IEEE Transactions on Knowledge and Data Engineering, 2018.
Koren, Yehuda "Factorization Meets the Neighborhood: a Multifaceted Collaborative Filtering Model," Proceedings of the 14th ACM SIGKDD International Conference on Knowledge Discovery and Data Mining, 2008, pp. 426-434.
Koren, Yehuda, et al. "Matrix Factorization Techniques for Recommender Systems", Computer, Published by IEEE Computer Society, 2009, pp. 42-49.
Krishnan, Adit et al., "An Adversarial Approach to Improve Long-Tail Performance in Neural Collaborative Filtering", Proceedings of the 27th ACM International Conference on Information and Knowledge Management, 2018, pp. 1491-1494.
Lee, Hoyeop et al. "MeLU: Meta-Learned User Preference Estimator for Cold-Start Recommendation", Proceedings of the 25th ACM SIGKDD International Conference on Knowledge Discovery & Data Mining, 2019, pp. 1073-1082.
Li, Sheng et al. "Deep Collaborative Filtering via Marginalized Denoising Auto-encoder", Proceedings of the 24th ACM International Conference on Information and Knowledge Management, 2015, pp. 811-820.
I, Tianyu et al. "Deep Heterogeneous Autoencoders for Collaborative Filtering", 2018 IEEE International Conference on Data Mining (ICDM), IEEE, 2018.
Linden, Greg et al., "Amazon.com Recommendations: Item-to-Item Collaborative Filtering", IEEE Internet Computing, 2003, pp. 76-80.
Liu, Yudan et al. "Real-time Attention Based Look-alike Model for Recommender System", Proceedings of the 25th ACM SIGKDD International Conference on Knowledge Discovery & Data Mining, 2019.
Luo, Mi et al., "Metaselector: Meta-Learning for Recommendation with User-Level Adaptive Model Selection", Proceedings of The Web Conference, 2020, pp. 2507-2513.
Ma, Yifei et al., "Temporal-Contextual Recommendation in Real-Time", KDD '20, Aug. 23-27, 2020, pp. 2291-2299.
Mooney, Raymond J., et al. "Content-Based Book Recommending Using Learning for Text Categorization", Proceedings of the Fifth ACM conference on Digital Libraries, 2000.
Pan, Feiyang et al., "Warm Up Cold-start Advertisements: Improving CTR Predictions via Learning to Learn ID Embeddings", Proceedings of the 42nd International ACM SIGIR Conference on Research and Development in Information Retrieval, 2019.
Salakhutdinov, Russ, et al. "Probabilistic Matrix Factorization", Advances in Neural Information Processing Systems, 2007, pp. 1-8.
Shi, Shaoyun et al. "Attention-based Adaptive Model to Unify Warm and Cold Starts Recommendation", Proceedings of the 27th ACM International Conference on Information and Knowledge Management, 2018, pp. 127-136.
Slack, Dylan et al., "Fairness Warnings and Fair-MAML: Learning Fairly with Minimal Data", Proceedings of the 2020 Conference on Fairness, Accountability, and Transparency, 2020, pp. 200-209.
Strub, Florian, et al. "Hybrid Recommender System based on Autoencoders", Proceedings of the 1st workshop on Deep Learning for Recommender Systems, 2016, pp. 11-16.
Takács, Gabor, et al. "Matrix Factorization and Neighbor Based Algorithms for the Netflix Prize Problem", Proceedings of the 2008 ACM Conference on Recommender Systems, 2008, pp. 267-274.
Van den Oord, Aaron et al. "Deep content-based music recommendation", Advances in Neural Information Processing Systems 26 (2013), pp. 1-9.
Vartak, Manasi et al. "A Meta-Learning Perspective on Cold-Start Recommendations for Items", Advances in Neural Information Processing Systems, 2017.
Vilalta, Ricardo et al., "A Perspective View and Survey of Meta-Learning", Artificial Intelligence Review, Sep. 2001, pp. 77-95.
Vincent, Pascal et al. "Stacked Denoising Autoencoders: Learning Useful Representations in a Deep Network with a Local Denoising Criterion", Journal of Machine Learning Research, 2010, pp. 3371-3408.
Volkovs, Maksims et al. "Dropoutnet: Addressing Cold Start in Recommender Systems", Advances in Neural Information Processing Systems, 2017, pp. 1-10.
Wan et al., "Discriminative Latent Semantic Regression for Cross-Modal Hashing of Multimedia Retrieval", 2018 IEEE Fourth International Conference on Multimedia Big Data (BigMM), Oct. 21, 2018, pp. 1-7.
Wang, Hao et al. "Collaborative Deep Learning for Recommender Systems", Proceedings of the 21th ACM SIGKDD International Conference on Knowledge Discovery and Data Mining, 2015, pp. 1235-1244.
Wang, Chong et al. "Collaborative Topic Modeling for Recommending Scientific Articles", Proceedings of the 17th ACM SIGKDD International Conference on Knowledge Discovery and Data Mining, 2011.

(56) References Cited

OTHER PUBLICATIONS

Wang, Huiwei et al., "ML2E: Meta-Learning Embedding Ensemble for Cold-Start Recommendation", IEEE Access, Sep. 2020, pp. 165757-165768.

Xue, Hong-Jian, et al. "Deep Matrix Factorization Models for Recommender Systems", Proceedings of the Twenty-Sixth International Joint Conference on Artificial Intelligence, vol. 17, 2017, pp. 3203-3209.

Yang et al., "Shared Predictive Cross-Modal Deep Quantization", IEEE Transactions on Neural Networks and Learning Systems, vol. 29, No. 11, Nov. 2018, pp. 5292-5303.

Yin, Wenpeng "Meta-learning for Few-shot Natural Language Processing: A Survey", Jul. 2020.

Yuan, Bowen et al. "Improving Ad Click Prediction by Considering Non-displayed Events", Proceedings of the 28th ACM International Conference on Information and Knowledge Management, 2019.

Zhang, Shuai et al., "Autosvd++: An Efficient Hybrid Collaborative Filtering Model via Contractive Auto-encoders", Proceedings of the 40th International ACM SIGIR Conference on Research and Development in Information Retrieval, 2017, pp. 957-960.

Zhang, Yang et al., "How to Retrain Recommender System? A Sequential Meta-Learning Method", Proceedings of the 43rd International ACM SIGIR Conference on Research and Development in Information Retrieval, 2020, pp. 1479-1488.

Zhang, Yongfeng, et al. "Joint Representation Learning for Top-N Recommendation with Heterogeneous Information Sources", Proceedings of the 2017 ACM Conference on Information and Knowledge Management, 2017, pp. 1-10.

Agarwal, Pankaj et al., "Personalizing Similar Product Recommendations in Fashion E-commerce", Jun. 29, 2018, 5 pages.

Bhaskar, Karthik Raja Kalaiselvi et al., "Implicit Feedback Deep Collaborative Filtering Product Recommendation System", Sep. 8, 2020, 10 pages.

Hooda, Rahul et al., "Social Commerce Hybrid Product Recommender", International Journal of Computer Applications, vol. 100, No. 12, Aug. 2014, pp. 43-49.

\* cited by examiner

SIMULTANEOUSLY LEARNING INPUTS AND MODEL PARAMETERS IN A TRAINING PHASE

Obtain user input vectors for a set of users and item input vectors for a set of items. The user and item input vectors are based on training data that includes known user feedback for a subset of user/item pairs
110

Apply a machine learning model to the user and item input vectors to obtain predicted feedback for the users with respect to the items
120

Update the user and item input vectors and the model parameters of the machine learning model to minimize the difference between the predicted feedback and the corresponding known feedback
130

Repeat steps 120-130 for a number of iterations to learn the optimal input vectors and network parameters for predicting user feedback
140

*FIG. 1*

METHODS FOR SIMULTANEOUS LEARNING OF INPUTS AND PARAMETERS ON MACHINE LEARNING-BASED RECOMMENDER SYSTEMS

RELATED APPLICATIONS

This application claims the benefit of U.S. Provisional Application No. 63/089,677 filed on Oct. 9, 2020, and titled "Simultaneous Learning of the Inputs and Parameters in Neural Collaborative Filtering," the contents of which are incorporated by reference herein as if fully disclosed herein.

BACKGROUND OF THE INVENTION

1. Field of the Invention

This invention relates generally to machine learning-based recommender systems and, more specifically, to simultaneous learning of inputs and model parameters in a recommender system.

2. Description of the Background Art

The goal of a recommender system is to help users identify the items that best fit their personal tastes from a large set of items. With the explosive growth of e-commerce in the past few decades, there are more product offerings than consumers can process, and recommender systems have become imperative to overcome this overload problem. The goal of recommender systems is to take known user feedback and predict unknown user feedback on items, which can be helpful in providing a list of suggested items to a user. The feedback, often referred to as the interaction, can be implicit (e.g., purchased/likely to purchase) or explicit (e.g., a rating between 1 and 5). As ratings tend to provide more accurate insight about user preferences, many recommender systems focus on predicting user ratings.

Many recommender systems use neural networks to make predictions. For example, neural collaborative filtering (NCF) systems apply neural network encoders to user and item data to generate lower-dimensional representations of the user and item data, and then use another neural network to predict user ratings on the items based on the user and item representations.

Generally, there are two types of inputs used in recommender systems, such as NCF systems. The first one is user and item IDs, where each ID is converted to a one-hot-encoding vector and then multiplied by an embedding matrix. The second one is user interaction vectors and item interaction vectors. The user interaction vector is comprised of user feedback on all the items, where there is a zero value for items on which there is no feedback from the user. An example of user feedback is user ratings. The item interaction vector is comprised of all feedback given to an item. It is known that interaction vectors outperform user/item IDs as the input in an NCF recommender system.

The user interaction vectors and item interaction vectors used in a recommender system are typically based on user ratings. Table 1 below is an example rating matrix, where there are four users and two items, and the ratings are between 1 and 5. Zero means the user has not rated the item (i.e., the rating is unknown).

TABLE 2

|  | Item #1 | Item #2 |
| --- | --- | --- |
| User #1 | 5 | 1 |
| User #2 | 5 | 0 |
| User #3 | 0 | 1 |
| User #4 | 0 | 5 |

Ratings of 4 Users on 2 Items

Each row of the table corresponds to a user interaction vector, and each column of the table corresponds to an item interaction vector. In this example, the user interaction vector for user #1 would be [5,1], and the item interaction vector for item #1 would be [5,5,0,0].

There are shortcomings in using ratings as the input to a recommender system as the similarities and differences in user tastes are not always reflected in the input space. For instance, note the following with respect to the example ratings matrix of Table 1:
  User #1 and user #2 both gave rating 5 to item #1.
    They are similar, and their Euclidian distance is 1.
  User #1 and user #3 both gave rating 1 to item #2
    They are similar, but their Euclidian distance is 5.
  User #3 gave item #2 a rating of 1. User #4 gave item #2 a rating of 5.
    They are dissimilar, and their Euclidian distance is 4.
User #1 gives the same rating as user #2 on one item, namely item #1. Likewise, user #1 gives the same rating as user #3 on one item, namely item #2. However, user #2 ends up much closer to user #1 in the input space than user #3 does to user #1. What makes the input space even worse, is the distance between dissimilar users #3 and #4 is 4, which is smaller than the distance between similar users #1 and #3.

Known recommender systems rely on nonlinear activation functions, making networks deep, and creating multiple user and item representations (from different network structures) to compensate for input space shortcomings. In other words, they rely on the network structure to compensate for shortcomings of using fixed interaction vectors as the input.

As entities rely more and more on recommender system, there is demand for continued performance improvement in such systems. As a result, there is a need for a better way to overcome the shortcomings in the input space.

SUMMARY OF THE DISCLOSURE

The present disclosure relates to a machine learning-based recommender system and method in which both input vectors and model parameters are learned during training. Unlike known systems, the input vectors are not fixed. Rather, they are treated as learnable parameters, which leads to better user and item representations. This in turn leads to better user feedback predictions and better product recommendations.

In a training phase, the recommender system obtains user input vectors for a set of users and item input vectors for a set of items. The user and item input vectors are based on training data that includes known user feedback with respect a subset of user item/pairs, such as user ratings on items or purchase history with respect to the items. The system applies a machine learning model to the user and item input vectors to obtain predicted feedback for the users with respect to the items (e.g., to obtain each user's predicted feedback for each of the items). Examples of predicted feedback are predicted ratings or a probability that a user will buy an item. In one embodiment, the machine learning model is a neural network collaborative filtering model.

Using the predicted feedback that has corresponding known feedback, the system updates the user and item input vectors and the model parameters of the machine learning model to minimize the difference between the predicted feedback and the corresponding known feedback of the users. The system then repeats the applying and updating steps for a number of iterations to optimize both the input vectors and the model parameters for use in a recommendation and prediction phase. The parameters and input vectors updated in a previous iteration are used in a next iteration. In certain embodiments, the system alternates updating the input vectors and network parameters (e.g., updates the model parameters, applies the machine learning model with updated parameters to the input vectors, updates the input vectors, applies the machine learning model to the updated input vectors, updates the model parameters, and so on). During the training phase, a user input vector is learned for each user in the set, and an item input vector is learned for each item in the set.

In one embodiment, the user and item input vectors are interaction vectors that are based on known user feedback. The interaction vectors have zero and non-zero values. The non-zero values correspond to user-item pairs for which feedback is known, and the zero values correspond to user-item pairs for which feedback is unknown. The non-zero values of the user and item interaction vectors are treated as adjustable variables and learnable parameters during the training phase. The non-zero values are initialized to the user feedback at the start of training (e.g., equal to user ratings), and the system then adjusts the non-zero elements during the training phase. This leads to better user feedback predictions because the first layer of machine learning model acts as an implicit user/item embedding matrix. The non-zero elements of the interaction vector determine which embedding vectors are chosen in the first layer. The non-zero elements also determine the weight given to the embedding vectors. Therefore, by learning the non-zero elements of the input vectors, the system is learning the weights to use in the first layer of the machine learning model, as opposed to prior methods which essentially fix the weights to the user feedback.

The learned input vectors and model parameters are used in a prediction and recommendation phase to recommend one or more items to a test user. The test user is part of the set of users for which an input vector was learned in the training phase. To make a recommendation for a test user, the system obtains the user input vector learned in the training phase for the test user. The system also obtains an item input vector learned in the training phase for an item for which the test user has not provided feedback (e.g., an item unrated by the test user or not previously purchased by the test user). The system applies the machine learning model trained in the training phase to the learned input vectors for the test user and the item to obtain the test user's predicted feedback for the item.

The system repeats these steps with respect to the test user and a plurality of other items for which the test user has not provided feedback. The system uses the test user's predicted feedback for the plurality of items to recommend one or more items to the test user.

BRIEF DESCRIPTION OF THE DRAWINGS

FIG. 1 is a flowchart that illustrates a method, according to one embodiment, for simultaneously learning inputs and model parameters in a training phase for a recommender system.

DETAILED DESCRIPTION OF THE PREFERRED EMBODIMENTS

The present disclosure relates to a machine learning-based recommender system and method in which both input vectors and model parameters are learned during training. The methods disclosed herein are performed by a computer system ("the system").

Both a training phase and a prediction and recommendation phase are described herein for the recommender system. Unlike known recommender systems, in which only the machine learning model parameters are learned in training, user and item input vectors also are treated as learnable parameters in the training phase. The input vectors and model parameters learned in the training phase are used to predict user feedback on items and make product recommendations in a prediction and recommendation phase. Each of these phases is described below.

1. Simultaneously Learning Inputs and Model Parameters in a Training Phase 1.1. Training Method A method for training a recommender system is described with respect to FIG. 1. The system obtains user input vectors for a set of users and item input vectors for a set of items (step 110). The input vectors are based on training data that includes known user feedback with respect to a subset of user/item pairs (e.g., a sparse ratings matrix). Examples of user feedback are user ratings or user purchase history. Examples of input vectors are interaction vectors based on a sparse ratings matrix (see Section 1.2 below for further explanation).

The system applies a machine learning model to the user and item input vectors to obtain predicted feedback for the users with respect to the items (e.g., to obtain each user's predicted feedback for each of the items) (step 120). The machine learning model may be a linear model or a set of one or more neural networks. The system then updates the user and item input vectors, as well as the parameters of the machine learning model, to minimize the difference between the predicted feedback and the corresponding known feedback (step 130). In performing step 130, the system uses the predicted feedback for which there is corresponding known feedback. For example, if user 1 has rated item 10, then the user 1's predicted feedback for item 10, as well as user 1's known feedback for item 10, are compared and used in step 130. Conversely, if user 1 has not rated item 11, then user 1's predicted feedback for item 11 is not used in step 130.

The system repeats the applying and updating steps (i.e., steps 120 and 130) for a number of iterations to learn both the optimal input vectors and the optimal model parameters for use in a recommendation and prediction phase. The steps may be repeated for a fixed number of iterations or until convergence is reached. The model parameters and input vectors updated in a previous iteration are used in a next iteration. A user input vector is learned for each of the users in the user set, and an item input vector is learned for each of the items in the item set.

1.2 Example Embodiment

Figure 4:
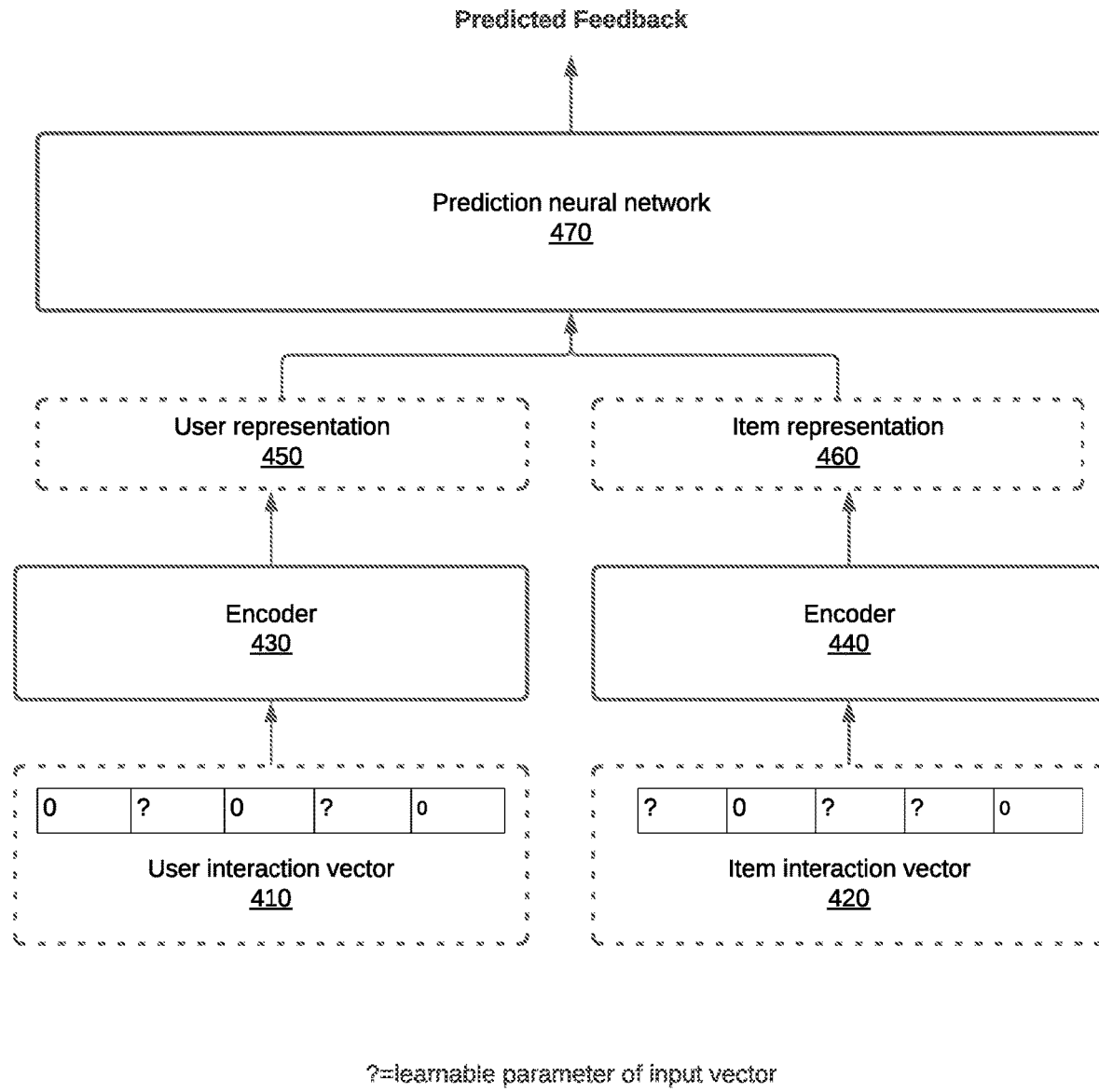
FIG. 4 is a block diagram of an example machine learning model.

In one embodiment of the above-described method, the machine learning model is a neural collaborative filtering (NCF) model, and the input vectors are user and item interaction vectors. FIG. 4 illustrates an NCF recommender system. The inputs to the system are user interaction vectors 410 and item interaction vectors 420. Neural network encoders 430, 440 take the user interaction vectors 410 and the item interaction vectors 420 and generate user and item representations 450, 460. A prediction neural network 470 receives a combination of the user and item representations 450, 460 and generates predicted ratings. The variables in training the system are the input vectors 410, 420, as well as the parameters of networks 430, 440, and 470.

Each of the neural network encoders 430, 440 may be any neural network that can receive a multidimensional input vector and generate a lower-dimensional representation of the vector. For example, the neural network encoders may be multilayer perceptrons, long short-term networks (LSTMs), or convolutional networks. The prediction neural network 470 may be any neural network that can receive a multidimensional vector input and output a scalar value that is predictive of a user feedback (e.g., a multilayer perceptron).

The user and item interaction vectors each have fixed and learnable elements, where the learnable elements correspond to user-item pairs for which feedback is known. In one embodiment, the user and item interaction vectors are based on a sparse feedback matrix. Specifically, let $R \in \mathbb{R}^{m \times n}$ denote a sparse feedback matrix, where m and n are the number of user and items, respectively. $R_{jk}$ is the feedback of user j on item k. If $R_{jk} > 0$, then user j has provided feedback on item k, such as a rating of 1-5. If $R_{jk} = 0$, then the feedback of user j on item k is unknown. The initial user interaction input vector for the jth user is set to $R_{j,:}$ (the jth row of matrix R), and the initial item interaction vector for the kth item is set to $R_{:,k}$ (the kth column of matrix R). The non-zero elements of the interaction vectors are then adjusted during the training process to minimize the difference between predicted user feedback and corresponding known user feedback.

For example, take the rating matrix below, in which users can rate items from 1 to 5:

TABLE 2

|        | Item 1 | Item 2 | Item 3 | ... | Item n |
|--------|--------|--------|--------|-----|--------|
| User 1 | 1      | 0      | 0      | ... | 0      |
| User 2 | 0      | 5      | 0      | ... | 0      |
| User 3 | 0      | 0      | 0      | ... | 0      |
| ...    | ...    | ...    | ...    | ... | ...    |
| User m | 0      | 2      | 0      | ... | 3      |

A value of zero in a cell means there is no rating for the user/item pair corresponding to the cell.

The initial user interaction vector for user m would be row m in the matrix, which is as follows:

| 0 | 2 | 0 | ... | 3 |
|---|---|---|-----|---|

Initial interaction vector for user m

Likewise, the initial item interaction vector for item n would be column n in the matrix, which is as follows:

| 0 | 0 | 0 | ... | 3 |
|---|---|---|-----|---|

Initial interaction vector for item n

In the above vectors, the non-zero values correspond to user-item pairs for which feedback is known, and the zero values correspond to user-item pairs for which feedback is unknown.

The non-zero values of the user and item interaction vectors are treated as adjustable variables and learnable parameters during the training phase, as illustrated below:

| 0 | ? | 0 | ... | ? |
|---|---|---|-----|---|

Learnable vector for user m

| 0 | 0 | 0 | ... | ? |
|---|---|---|-----|---|

Learnable vector for item n

In the above, "?" represents a learnable parameter in the vector, and the "0"s are fixed.

Another example of a feedback matrix is a purchase history matrix, in which a zero value means that a user has not purchased an item and a non-zero value (e.g., 1) means the user purchased an item. As with the case with the interaction vectors based on a ratings matrix, the system learns the non-zero values of interaction vectors based on a purchase history matrix.

Learning the non-zero elements in the input vectors instead of keeping them fixed to user feedback increases the power of the machine learning model to learn user and item representations that result in accurate predictions. While the neural network encoder that generates the lower-dimensional user representations may include several nonlinear layers, the output of the first fully connected layer is the dot product of the user input vector and a weight matrix that includes a $d_u$ dimensional vector for each of the items in the set of items, thus acting as an implicit item embedding matrix. Since the non-zero elements of the user input vector determine which item embedding vectors are chosen, the output of the first layer of the user neural network encoder (e.g., encoder 430) is the weighted sum of the embedding vectors of the items that are rated by user. Likewise, the output of the first fully connected layer of the neural network encoder that generates the lower-dimensional item representations is the dot product of the item input vector and another weight matrix, which includes a $d_i$ dimensional vector for each of the users in the set of users, thus acting as an implicit user embedding matrix. Since the non-zero elements of the item input vector determine which user embedding vectors are chosen, the output of the first layer of the item neural network encoder (e.g., encoder 440) is weighted sum of the embedding vectors of the users which have rated the item.

The non-zero elements of the input vectors also determine the weight given to embedding vectors in the first layer of each of the encoding neural networks. Therefore, by learning the non-zero elements of the input vectors, the system is learning the weights to use in the first layer of the machine learning model, as opposed to prior methods which essentially fix the weights to the user feedback.

The method according to this embodiment can be described mathematically as follows:

For the jth user, the system creates the set $N_j=\{l|R_{jl}\neq 0, 1\leq l\leq n\}$, which contains the index of all the items for which there is feedback from the jth user. The system creates the set of user input vectors as $U\in\mathbb{R}^{m\times n}$, where $U_{j,:}$ is the input vector of jth user. The system learns $U_{jl}$ if $l\in N_j$ and fixes it to 0 otherwise. The output of the first layer of the network for the jth user is computed as $y_j^u=\sigma(U_{j,:};P^u)=\sigma(\Sigma_{l\in N_j}U_{jl}P_{l,:}^u)$ where $U_{jl}$ is a parameter that is learned, as opposed to the previous works that fix it to the rating value of the jth user on the lth item.

For the kth item, the system defines the set $N_k=\{l|R_{lk}\neq 0, 1\leq l\leq m\}$, which contains the index of all the users who gave a rating to the kth item. The system also defines the set of item input vectors as $V\in\mathbb{R}^{n\times m}$. The system learns $V_{kl}$ if $l\in N_k$ and fix it to 0 otherwise. The output of the first layer of the network for the kth item is computed as $y_k^i=\sigma(V_{k,:};P^k)=\sigma(\Sigma_{l\in N_k}V_{kl}P_{l,:}^k)$, learned, $V_{kl}$ is a parameter that is learned, as opposed to the previous works that fix it to the rating value of the lth user on the kth as item.

The objective function is defined as (Eq. 1):

$$\min_{\theta,U,V} E_{NCF}(z_{jk};\theta^{ui}) = \frac{1}{mn}\sum_{j=1}^{m}\sum_{k=1}^{n}\mathbb{I}(R_{jk}>0)\|R_{jk}-f(z_{jk};\theta^{ui})\|^2 \quad (1)$$

s.t.

$$z_{jk}=[z_j^u, z_k^i], \quad z_j^u=g^u(y_j^u;\theta_{L-1}^u), \quad z_k^i=g^i(y_k^i;\theta_{L-1}^i)$$

$$y_j^u=\sigma\left(\sum_{l\in N_j}U_{jl}P_{l,:}^u\right), \quad y_k^i=\sigma\left(\sum_{l\in N_k}V_{kl}P_{l,:}^i\right)$$

Where:

f( ) is the neural network that computes the predicted feedback based on the user and item representations (e.g., prediction network 470);

$z_j^u$ denotes the jth user representation;

$z_k^i$ denotes the kth item representation;

$g^u$ is the neural network that computes the user representations (e.g., encoder 430);

$g^i$ is the neural network that computes the item representations (e.g., encoder 440);

$y_j^u$ is the output of the first layer of $g^u$ for the jth user;

$y_k^i$ is the output of the first layer of $g^i$ for the kth item;

$\theta=[\theta_{L-1}^u, P^u, \theta_{L-1}^i, P^i, \theta^{ui}]$ contains all the learnable parameters of the three neural networks, $g^u$, $g^i$, and f( ) (e.g., networks 430, 440, and 470);

$P^u$ and $P^i$ contain the weights of the first layer of the user and item neural networks, $g^u$ and $g^i$;

$U_{jl}$ is a non-zero value of the jth user input vector and a learnable parameter;

$V_{kl}$ is a non-zero value of the kth item input vector and a learnable parameter; and the indicator function is denoted by $\mathbb{I}(arg)$, which returns 1 when arg is true, and 0 otherwise.

1.3 Alternating Optimizing Input Vectors and Network Parameters

Figure 2:
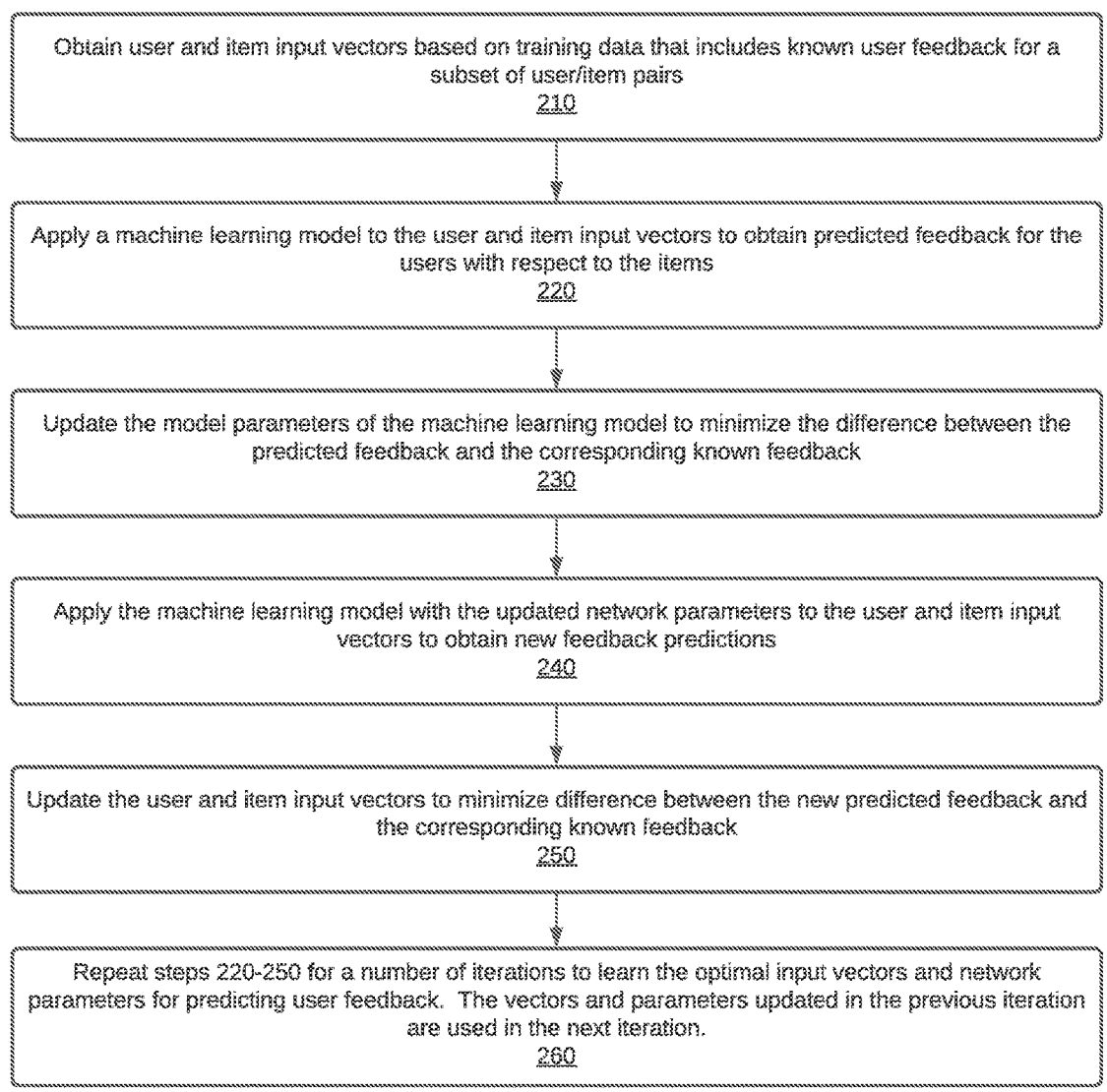
FIG. 2 is a flowchart that illustrates a further embodiment of the training method in which model parameters and input vectors are alternatively updated.
Figure 3:
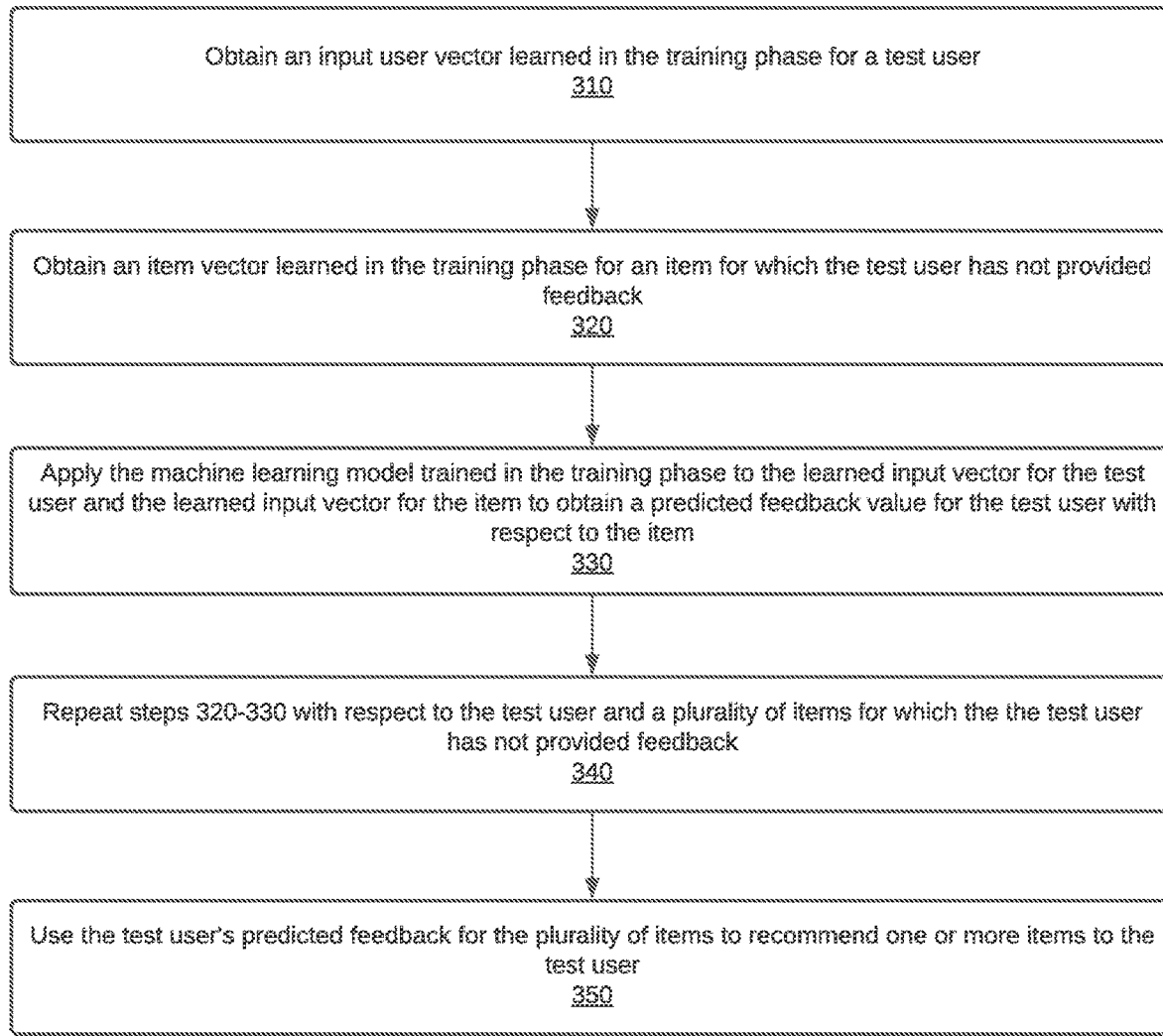
FIG. 3 is a flowchart that illustrates a method, according to one embodiment, for predicting a user's feedback on a number of items and recommending items to the user based on the predicted feedback.

FIG. 2 illustrates a further embodiment of the training method, in which the network parameters and input vectors are alternatively updated. As described above, the system obtains user and item input vectors, such as user/item interaction vectors, based on training data that includes known user feedback with respect to a subset of user/item pairs (step 210). The system applies a machine learning model to the user and item input vectors to obtain predicted user feedback with respect to the items (step 220). The system updates the model parameters of the machine learning model to minimize the difference between the predicted feedback and the corresponding known feedback (step 230).

After updating the model parameters, the system applies the machine learning model with the updated parameters to the user and item input vectors to obtain new predictions (step 240). The system then updates the user and item input vectors to minimize the difference between the new predicted feedback and the corresponding known feedback (step 250). Steps 220-250 then repeat for a number of iterations, where the input vectors and network parameters updated in the previous iteration are used in the next iteration. (step 260). The number of iterations may be fixed or performed until convergence is achieved.

1.4 Calculating Difference Between Predicted Feedback and Known Feedback

In one embodiment, the system calculates the difference between predicted user feedback and known user feedback by calculating the mean square error between the predicted and actual feedback as follows:

$$MSE(\hat{y}_i, y_i) = \frac{1}{N}\sum_{i=1}^{N}(\hat{y}_i-y_i)^2$$

Where:

N is the number of observations;

$\hat{y}_i$ is the predicted feedback; and $y_i$ is the actual feedback.

Another option for calculating the difference between the predicted user feedback and known user feedback is to use the mean absolute error between the actual and predicted feedback.

2. Prediction and Recommendation Phase

The input vectors and model parameters learned in the training phase are used in a prediction and recommendation phase to recommend one or more items to a test user. To make a recommendation for a test user, the system obtains the user input vector learned in the training phase for the test user (step 310). The system also obtains an item input vector learned in the training phase for an item unrated by the test user (step 320).

The system applies the machine learning model trained in the training phase to the learned input vectors for the test user and the unrated item to obtain a predicted feedback value for the test user with respect to the item (step 330). For example, this may be a predicted rating for the user with respect to the item or a prediction of the likelihood of a user to purchase the item.

The system repeats these steps with respect to the test user and a plurality of other items for which the test user has not provided feedback (step 340). The system uses the test user's predicted feedback for the plurality of items to recommend one or more items to the test user (step 350).

3. Example Architecture

Figure 5:
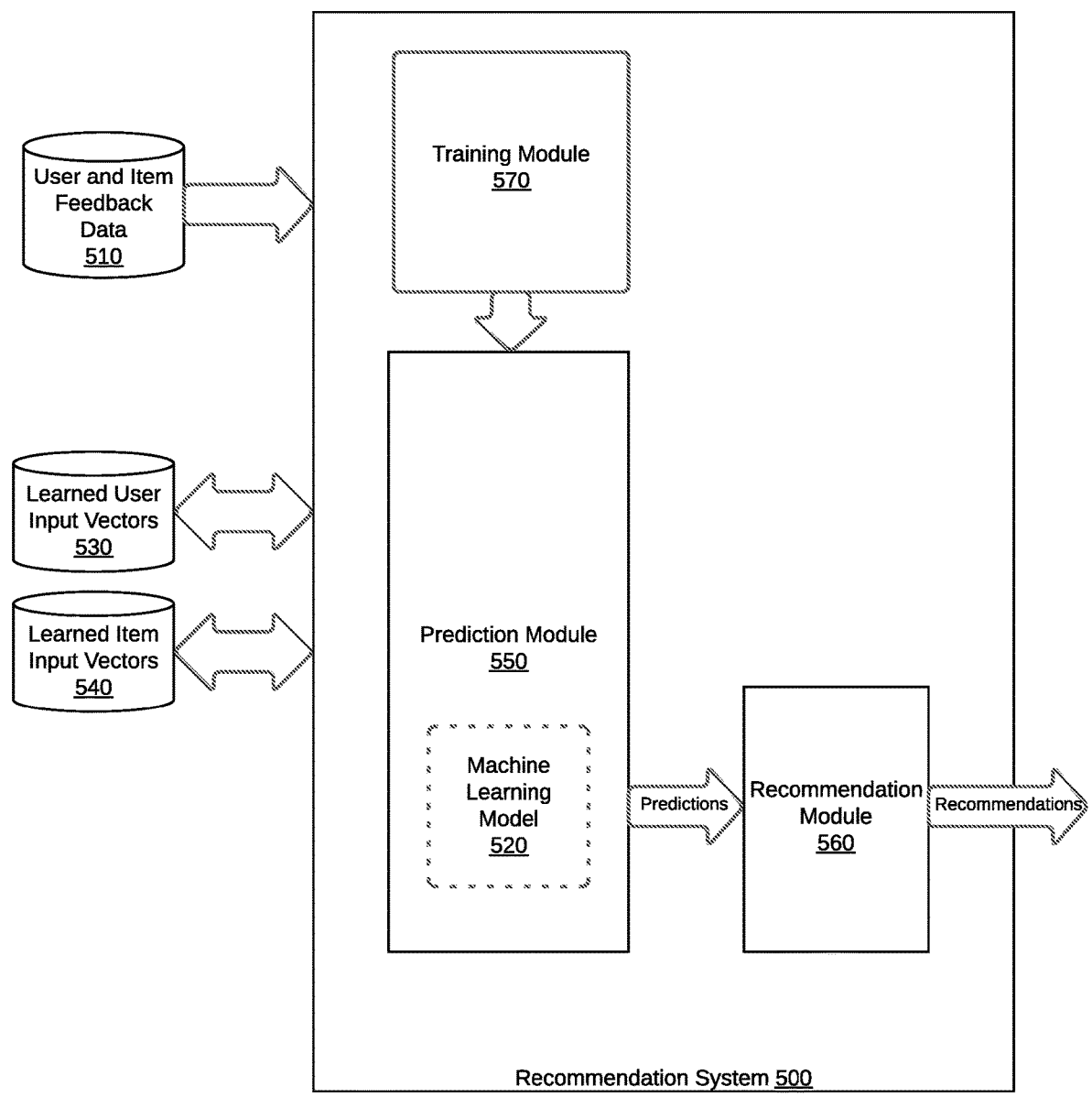
FIG. 5 is a block diagram of an example recommender system.

FIG. 5 illustrates an example recommendation system software architecture. A prediction module 550 predicts user feedback on items based on user input vectors 530 and item input vectors 540 learned in a training phase. The prediction module 550 uses a machine learning model 520 to make predictions. In one embodiment, the machine learning model 520 is a neural collaborative filtering model, as depicted in FIG. 4. A training module 570 trains the machine learning model 520 based on known user and item feedback data, such as user ratings for a set of items or user purchase history data for the items.

A recommendation module 560 receives user feedback predictions from the prediction module 550 and recommends items to users based on the predictions. For example, it may select items associated with the n highest predicted feedback after factoring in any applicable business rules. Those skilled in the art will appreciate that a recommendation system may have other modules that are not relevant to the disclosure herein.

4. General

The methods described with respect to FIGS. 1-5 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be stand-alone or connected to a computer network as a server.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for automatically recommending one or more items to a user using a machine learning model in which both input vectors and model parameters are learned during training, the method comprising:
performing the following with respect to a training phase for the machine learning model:
 (a) obtaining user input vectors for a set of users and item input vectors for a set of items, wherein the user and item input vectors are created from user and item data in a training data set that includes known user feedback with respect to a subset of user/item pairs:
 (b) training a machine learning model having one or more model parameters with the user and item input vectors, the training a machine learning model comprising:
  mapping, by a set of encoding neural networks, the user and item input vectors to lower dimensional user and item vector representations, and
  calculating, by a prediction neural network, feedback predictions based on combinations of the lower dimensional user and item vector representations to obtain predicted feedback for the users with respect to the items;
 (c) updating the user and item input vectors and the model parameters of the machine learning model to minimize a difference between the predicted feedback and the known user feedback;
 (d) repeating steps (b)-(c) for a number of iterations to learn both the input vectors and the model parameters for use in a recommendation and prediction phase, wherein the model parameters and input vectors updated in a previous iteration are used in a next iteration, and wherein a user input vector is learned for each of the users in the set of users and an item input vector is learned for each of the items in the set of items;
performing the following with respect to a prediction and recommendation phase:
 (e) obtaining an input user vector learned in the training phase for a test user, wherein the test user is in the set of users;
 (f) obtaining an input item vector learned in the training phase for an item unrated by the test user, wherein the item is in the set of items;
 (g) further training the machine learning model trained in the training phase with the learned input vector for the test user and the learned input vector for the item, the further training the machine learning model comprising:
  obtaining, based on the learned input vector for the test user and the learned input vector for the item, a predicted feedback for the test user with respect to the item;
 (h) repeating steps (f)-(g) with respect to the test user and a plurality of items for which the test user has not provided feedback; and
 (i) using the test user's predicted feedback for the plurality of items to recommend one or more items to the test user.

2. The method of claim 1, wherein the user input vectors are user interaction vectors having zero and non-zero values and the item input vectors are item interaction vectors having zero and non-zero values, wherein the non-zero values of the user and item interaction vectors correspond to user-item pairs for which feedback is known, and wherein the non-zero values of the user and item interaction vectors are learnable parameters during the training phase.

3. The method of claim 1, wherein the input vectors and the model parameters are updated alternatively in iterations of steps (b) and (c) such that the system performs the training and updating steps as follows:
training the machine learning model with the user and item input vectors to obtain the user's predicted feedback for the items;
updating the model parameters to minimize the difference between the predicted feedback and the known user feedback;
training the machine learning model with the user and item input vectors using the updated model parameters to obtain new feedback predictions;
updating the user and item input vectors to minimize the difference between the new feedback predictions and the known user feedback;

training the machine learning model with the new user and item input vectors to obtain further new feedback predictions;

updating the model parameters to minimize the difference between the further new feedback predictions and the known user feedback; and repeating the training and updating steps for a number of iterations.

4. The method of claim 1, wherein the machine learning model is a linear model or a set of one or more neural networks.

5. The method of claim 1, wherein the updating step comprises calculating mean square errors between the predicted ratings and the corresponding known ratings.

6. The method of claim 1, wherein the feedback is ratings.

7. The method of claim 1, wherein the known user feedback is whether a user purchased an item, and the predicted feedback is a probability that a user would purchase an item.

8. A method, performed by a computer system, for training a machine learning model to recommend one or more items to a user, the method comprising:

obtaining user input vectors for a set of users and item input vectors for a set of items, wherein the user and item input vectors are created from user and item data in a training data set that includes known user feedback with respect to a subset of user/items pairs;

training a machine learning model having one or more model parameters with the user and item input vectors, the training a machine learning model comprising:

mapping, by a set of encoding neural networks, the user and item input vectors to lower dimensional user and item vector representations, and calculating, by a prediction neural network, feedback predictions based on combinations of the lower dimensional user and item vector representations to obtain predicted feedback for the users with respect to the items;

updating the user and item input vectors and the model parameters of the machine learning model to minimize a difference between the predicted feedback and the known user feedback, wherein the input vectors and the model parameters are updated alternatively in iterations of the training and updating steps such that the system performs the training and updating steps as follows:

training the machine learning model with the user and item input vectors to obtain the user's predicted feedback for the items;

updating the model parameters to minimize the difference between the predicted feedback and the known user feedback;

training the machine learning model with the user and item input vectors using the updated model parameters to obtain new feedback predictions;

updating the user and item input vectors to minimize the difference between the new feedback predictions and the known user feedback;

training the machine learning model with the new user and item input vectors to obtain further new feedback predictions;

updating the model parameters to minimize the difference between the further new feedback predictions and the known user feedback; and repeating the training and updating steps for a number of iterations to learn both the input vectors and the model parameters that optimize feedback predictions, wherein the model parameters and input vectors updated in a previous iteration are used in a next iteration and wherein a user input vector is learned for each of the users in the set of users and an item input vector is learned for each of the items in the set of items.

9. The method of claim 8, wherein the user input vectors are user interaction vectors having zero and non-zero values and the item input vectors are item interaction vectors having zero and non-zero values, wherein the non-zero values of the user and item interaction vectors correspond to user-item pairs for which feedback is known, and wherein the non-zero values of the user and item interaction vectors are learnable parameters during the training phase.

10. The method of claim 8, wherein the machine learning model is a linear model or a set of one or more neural networks.

11. The method of claim 8, wherein the feedback is ratings.

12. The method of claim 8, wherein the known user feedback is whether a user purchased an item, and the predicted feedback is a probability that a user would purchase an item.

* * * * *

UNITED STATES PATENT AND TRADEMARK OFFICE
CERTIFICATE OF CORRECTION

| | | |
|---|---|---|
| PATENT NO. | : 12,141,852 B2 | Page 1 of 1 |
| APPLICATION NO. | : 17/141925 | |
| DATED | : November 12, 2024 | |
| INVENTOR(S) | : Ramin Raziperchikolaei | |

It is certified that error appears in the above-identified patent and that said Letters Patent is hereby corrected as shown below:

On the Title Page

In the Title: item (54) and in the Specification Column 1, Lines 1-4:
• Please replace "ON" with --IN--

Signed and Sealed this
Eleventh Day of March, 2025

Coke Morgan Stewart
*Acting Director of the United States Patent and Trademark Office*